(12) United States Patent
Herloski et al.

(10) Patent No.: US 8,624,949 B2
(45) Date of Patent: Jan. 7, 2014

(54) RASTER OUTPUT SCANNER WITH BEAM DELAY COMPENSATION TO COUNTERACT JITTER AND WIPER-INDUCED BANDING

(75) Inventors: Robert Paul Herloski, Webster, NY (US); Robert Kleckner, Pittsford, NY (US); Moritz P. Wagner, Rochester, NY (US); Jack Lestrange, Macedon, NY (US); Thomas R. Race, Rochester, NY (US); Timothy J. Clark, Marion, NY (US); Jess R. Gentner, Rochester, NY (US); Roger L. Triplett, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 352 days.

(21) Appl. No.: 13/074,797

(22) Filed: Mar. 29, 2011

(65) Prior Publication Data
US 2012/0250063 A1    Oct. 4, 2012

(51) Int. Cl.
*B41J 2/435*   (2006.01)
*B41J 2/47*    (2006.01)

(52) U.S. Cl.
USPC ........................................... 347/235; 347/250

(58) Field of Classification Search
USPC ................. 347/116, 229, 231, 233–235, 243, 347/248–250, 259–261
See application file for complete search history.

(56) References Cited

U.S. PATENT DOCUMENTS

| | | | |
|---|---|---|---|
| 4,429,218 A | 1/1984 | Thomas | |
| 4,620,237 A | 10/1986 | Traino et al. | |
| 4,635,000 A | 1/1987 | Swanberg | |
| 4,663,523 A | 5/1987 | Swanberg | |
| 4,870,273 A | 9/1989 | Brueggemann | |
| 4,872,065 A | 10/1989 | Isono et al. | |
| 5,111,062 A | 5/1992 | Hunter et al. | |
| 5,138,479 A * | 8/1992 | Ando | 359/216.1 |
| 5,341,155 A | 8/1994 | Elrod et al. | |
| 5,485,195 A | 1/1996 | Nacman | |
| 5,539,441 A | 7/1996 | Appel et al. | |
| 5,933,182 A | 8/1999 | Appel | |
| 5,959,683 A | 9/1999 | Harrington | |
| 6,055,005 A | 4/2000 | Appel et al. | |
| 6,411,336 B1 | 6/2002 | Harrington | |
| 6,570,675 B1 * | 5/2003 | Asada | 358/1.7 |
| 6,654,044 B2 | 11/2003 | Akuta | |
| 7,266,250 B2 | 9/2007 | Bloomberg et al. | |
| 7,489,830 B2 | 2/2009 | Bloomberg et al. | |
| 2002/0135822 A1 * | 9/2002 | Morita et al. | 358/505 |
| 2006/0133690 A1 | 6/2006 | Bloomberg et al. | |
| 2008/0024843 A1 | 1/2008 | Bloomberg et al. | |

* cited by examiner

*Primary Examiner* — Hai C Pham
(74) *Attorney, Agent, or Firm* — Fay Sharpe LLP (57) ABSTRACT

Methods and raster output scanner (ROS) systems are presented in which beam delay values are set for an array of ROS light sources based on wiper error and jitter error with column alignment achieved at an alignment location spaced from a center of scan (COS) location toward an end of scan location (EOS) along a fast scan range of operation of the ROS.

14 Claims, 8 Drawing Sheets

RASTER OUTPUT SCANNER WITH BEAM DELAY COMPENSATION TO COUNTERACT JITTER AND WIPER-INDUCED BANDING

BACKGROUND

The present exemplary embodiments relate to raster output scanner (ROS) apparatus and to techniques for beam mapping to adjust ROS operation to address wiper and jitter errors. Wiper errors are found in printers and other systems employing scanning of laser beams or other light beams for image rendering. This error is typically caused by manufacturing and mounting tolerances of the ROS in a printing system, where the output beams do not maintain a single column alignment at all locations in the fast scan (cross-process) direction, and instead tend to "rotate" with fast scan position, similar to the operation of automobile windshield wipers. This problem has conventionally been addressed by aligning the beams (column alignment) at a center of scan (COS) position in the fast scan range so that the wiper effect is seen in approximately equal amounts (in opposite directions) at the extreme ends of the scan range (start of scan (SOS) and end of scan (EOS)). In this manner, the wiper error amount is effectively distributed along the ROS fast scan range, with the range center having the best column alignment. Jitter error is also found in optical scanning systems, appearing as pixel misregistration in scan lines formed in the fast scan direction. Jitter can be cause by rotational or velocity variations in the ROS polygon scanner, as well as optical component misalignment, scan direction failures and pixel clock circuit failures. Jitter can be corrected by a variety of techniques, such as adjusting the power level and focus of the scanning beam. As quality requirements become stricter for printers and other systems employing multiple beam raster scanning, improved ROS manufacturing techniques are important to address wiper and jitter errors without adding to product cost.

BRIEF DESCRIPTION

The present disclosure relates to ROS apparatus, printing systems, and manufacturing adjustment techniques in which beam delay values are determined by beam mapping for an array of light sources based on both wiper error and jitter error. Column alignment is achieved at a location other than the COS so as to combat combined jitter/wiper effects, where the alignment location in certain embodiments is between the COS and EOS or at the EOS location. The inventors have appreciated that the wiper effect can significantly amplify the effect of fast scan jitter variations, particularly at the EOS, and that column alignment at the EOS or between the COS and EOS can advantageously reduce the cumulative error of these effects. This may be employed in association with printing systems and other systems in which multiple optical beams are scanned along a fast scan direction toward a light-receiving medium for image generation or rendering.

Document processing systems and raster output scanners thereof are provided in accordance with one or more aspects of the disclosure. The ROS includes a plurality of light sources, such as a laser emitter array comprising a plurality of lasers in certain embodiments, which generate a plurality of light outputs. The ROS includes a driver that stores a plurality of beam delay values corresponding to the light sources, where the beam delay values are set such that column alignment is achieved at an alignment location spaced from a COS location toward an EOS location along a fast scan range of operation of the ROS. In operation, the driver selectively actuates the light sources according to the corresponding beam delay values based on a stream of image data to produce a plurality of modulated light outputs. The ROS also includes a scanner that directs the modulated light outputs toward a light-receiving medium, such as a photoreceptor in certain embodiments, along the fast scan direction to generate an image on at least a portion of the light-receiving medium. In certain embodiments, the ROS beam delay values are set to compensate for a combined effect of wiper error and jitter error.

Further aspects of the disclosure involve a method for manufacturing or adjusting a document processing system with a multi-beam ROS. The method includes determining a wiper error and a jitter error associated with the ROS, as well as determining beam delay values corresponding to individual light sources of the ROS at least partially according to the wiper error and the jitter error, and the beam delay values are stored in a memory of the ROS. In certain embodiments, the beam delay values are determined so as to compensate for a combined effect of the wiper error and the jitter error. In certain embodiments, the combined effect of the wiper error and the jitter error is determined by multiplying the wiper error and the jitter error to generate a combined error curve or function along the fast scan range of operation of the ROS. In other embodiments, the combined effect is determined by adding the wiper error and the jitter error to generate the combined error curve or function. In certain embodiments, the delay values are determined such that an area of the combined error curve or function is minimized along the fast scan range of operation of the ROS. In some embodiments, the delay values are determined such that column alignment is achieved at an alignment location spaced from a COS location toward an end of scan location along a fast scan range of operation of the ROS, and the alignment location in some implementations is at or near the EOS.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Several embodiments or implementations of the different aspects of the present disclosure are hereinafter described in conjunction with the drawings, wherein like reference numerals are used to refer to like elements throughout, and wherein the various features, structures, and graphical renderings are not necessarily drawn to scale. The disclosure relates to ROS operation and adjustment in which both jitter (optical and/or electrical) and wiper effects are compensated in a coordinated fashion through beam mapping to set ROS driver beam delay values for multiple beams.

Referring initially to FIGS. 1-4, these concepts are illustrated and described hereinafter in the context of exemplary document processing systems with marking devices for marking images onto intermediate (e.g., photoreceptor) or final printable media using raster output scanning with associated scanners and optics. However, the techniques and ROS systems of the present disclosure may be implemented in other forms of image generating or rendering systems, such as ink-based or other direct-marking printers, etc., by adjusting beam delays to minimize or mitigate artifact banding, including without limitation laser or other type light shows, stereo lithography, or direct plate, laser cutters for paper or other articles, imaging systems with multiple scanned beams going through a shared optical system concurrently, or other multiple rasterized writing in which two or more beams are provided or transmitted through a shared optical channel onto a medium.

Figure 1:
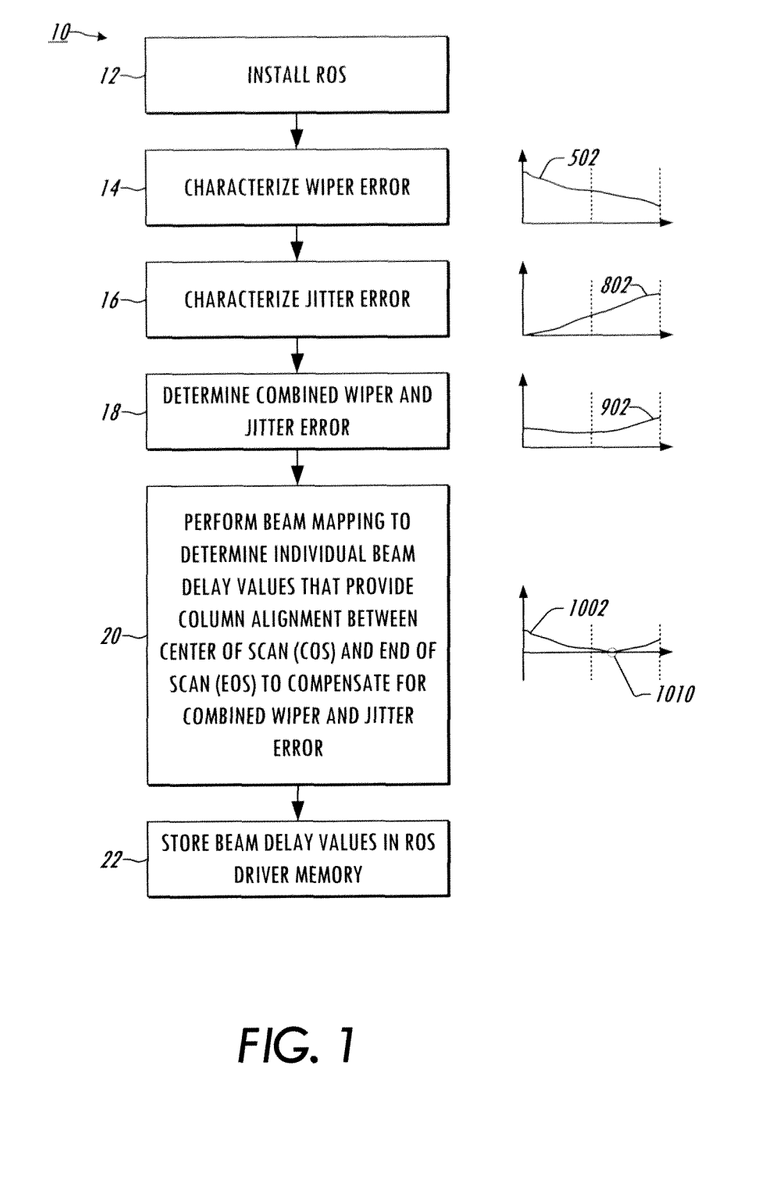
FIG. 1 is a flow diagram illustrating an exemplary method for manufacturing or adjusting a document processing system in accordance with one or more aspects of the disclosure.
Figure 2:
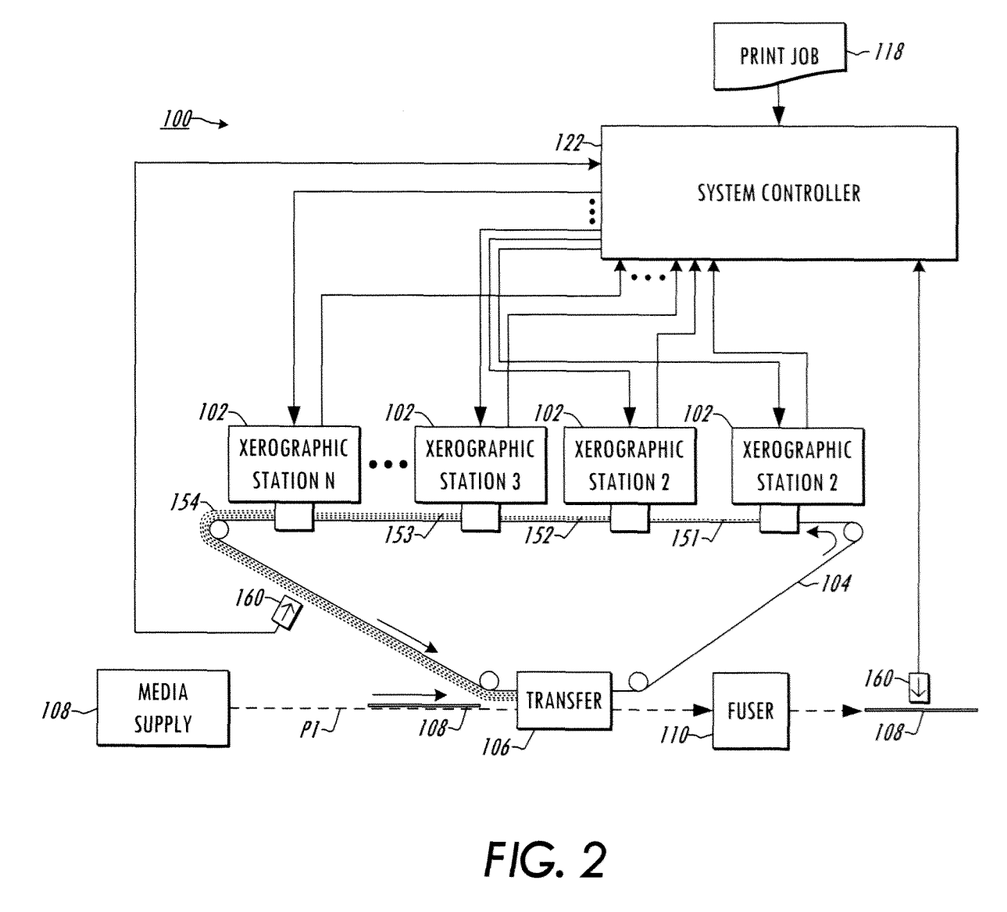
FIG. 2 is a simplified schematic system level diagram illustrating an exemplary multi-color document processing system with multiple xerographic marking devices disposed along a shared intermediate transfer belt (ITB, alternatively referred to as IBT (intermediate belt transfer)) in which the marking devices individually include ROSs in accordance with various aspects of the disclosure.
Figure 3:
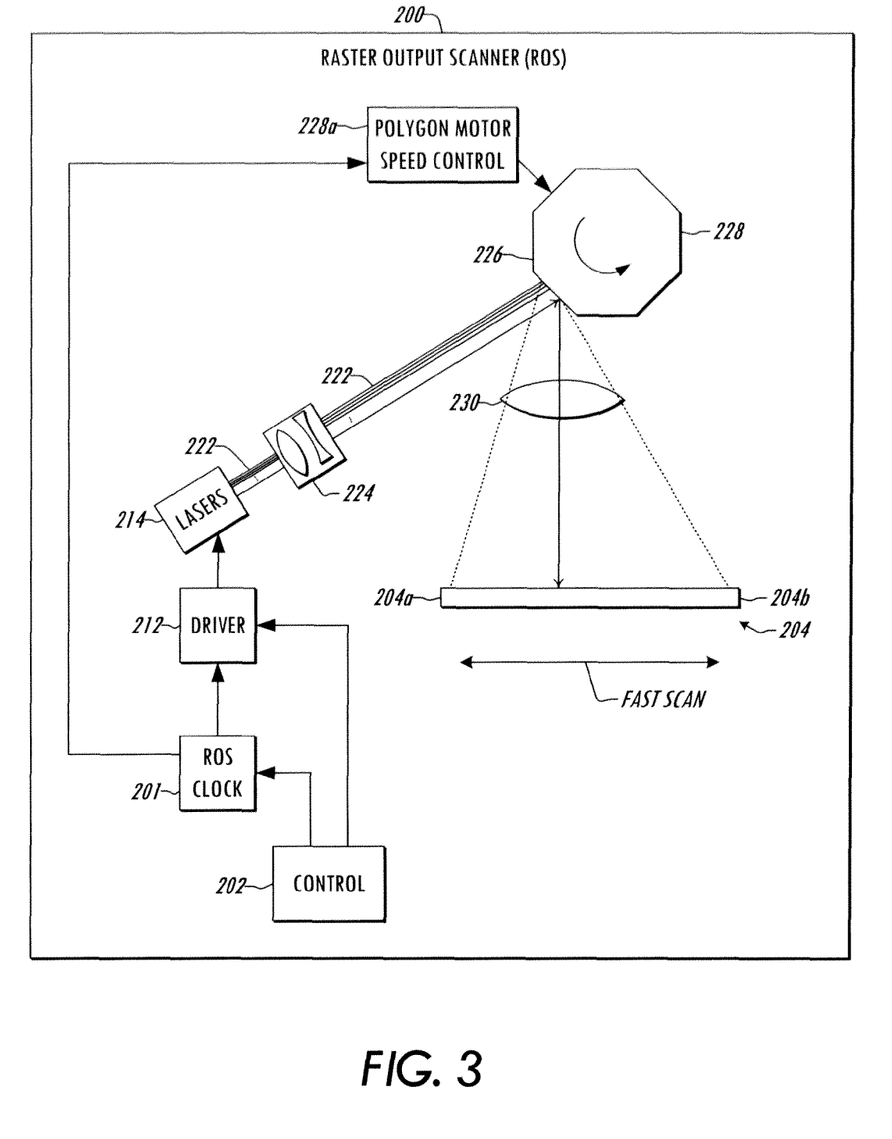
FIGS. 3 and 4 are simplified schematic diagrams illustrating an exemplary ROS with stored beam delay values set for compensation of combined wiper and jitter errors in accordance with various aspects of the disclosure.
Figure 4:
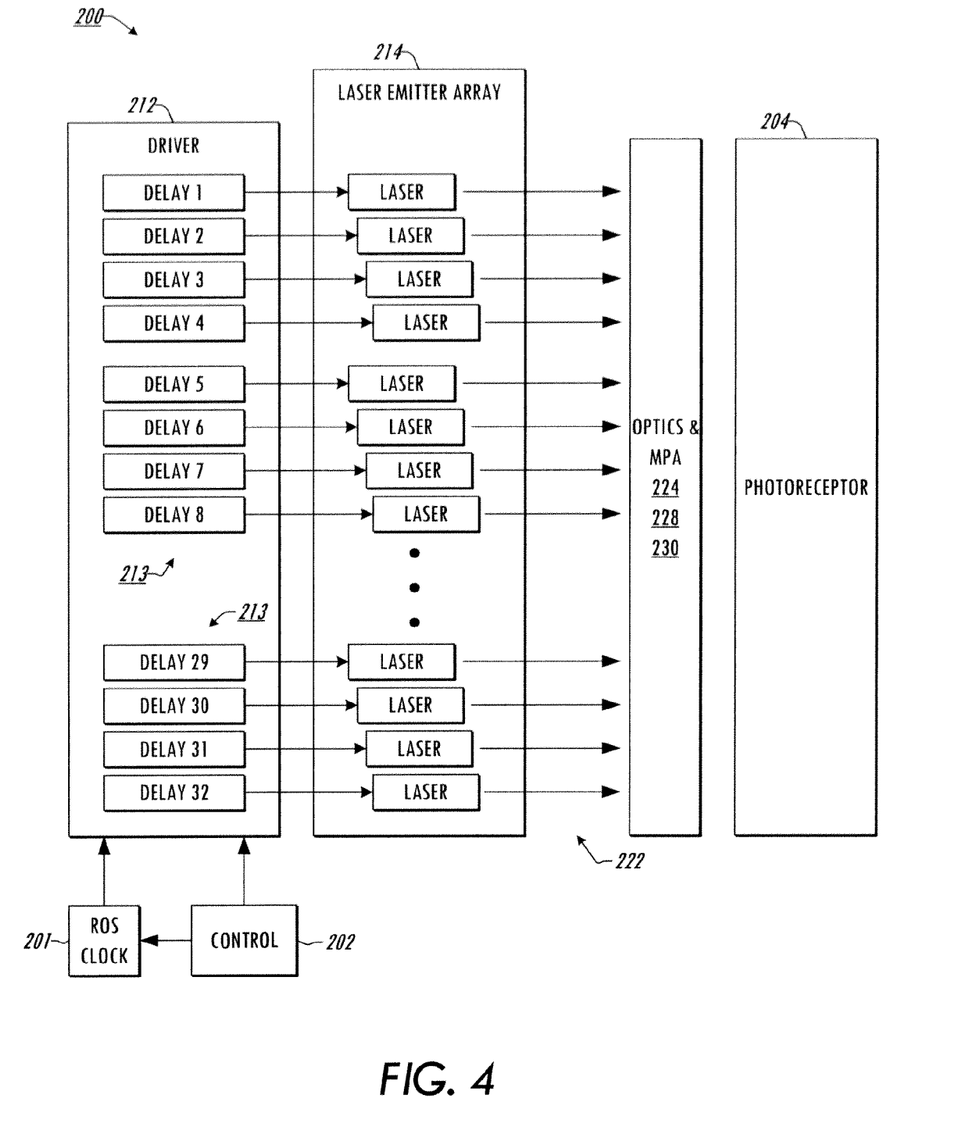

FIG. 1 illustrates an exemplary method 10 for manufacturing or adjusting a ROS in an imaging system, such as a printing system, and FIGS. 2-4 show a document processing system 100 and ROS 200 thereof in which stored beam delay values are set for compensation of combined wiper and jitter effects in accordance with one or more aspects of the disclosure. FIG. 2 illustrates an exemplary tandem multi-color document processing system 100 with a system controller 122 and marking devices 102 thereof including ROSs that may be initially setup or thereafter adjusted in accordance with the method 10. The system 100 includes a plurality of xerographic marking devices or print engines 102 individually operative to transfer toner marking material onto an intermediate substrate 104 that may or may not be a photoreceptor, in this case, a shared intermediate transfer belt 104 traveling in a counter clockwise direction in the figure past the xerographic marking devices 102. In certain embodiments, the marking devices 102 individually include a cylindrical drum photoreceptor 204 employed as an intermediate transfer substrate, and in other embodiments, the marking devices 102 may directly transfer marking material to a final printable media 108. Other embodiments are possible when these techniques are applied to Image On Image (IOI) systems. The illustrated printing system 100 includes a transfer component 106 (FIG. 2) disposed downstream of the marking devices 102 along a lower portion of the IBT path to transfer marking material from the IBT 104 to an upper side of a final print medium 108 (e.g., precut paper sheets in one embodiment) traveling along a path P1 from a media supply. After the transfer of toner to the print medium 108 at the transfer station 106 in FIG. 2, the final print medium 108 is provided to a fuser type affixing apparatus 110 on the path P1 where the transferred marking material is fused to the print medium 108.

The system controller 122 performs various control functions and may implement digital front end (DFE) functionality for the system 100, where the controller 122 may be any suitable form of hardware, processor-executed software and/or firmware, programmable logic, or combinations thereof, whether unitary or implemented in distributed fashion in a plurality of components, wherein all such implementations are contemplated as falling within the scope of the present disclosure. In a normal printing mode, the controller 122 receives incoming print jobs 118 and operates one or more of the marking devices 102 to transfer marking material onto the intermediate medium 104 in accordance with the print job 118. In operation of the marking devices 102, marking material (e.g., toner 151 for the first device 102 in FIG. 4) is supplied to an internal drum photoreceptor 204 (schematically shown in FIG. 3) via a ROS 200 of the marking device 102. A surface of the intermediate medium 104 is adjacent to and/or in contact with the drum photoreceptor 204 and the toner 151 is transferred to the ITB 104 with the assistance of the biased transfer roller (not shown) to attract oppositely charged toner 151 from the drum 204 onto the ITB surface as the ITB 104 passes through a nip between the drum 204 and the charged transfer roller. The toner 151 ideally remains on the surface of the ITB 104 after it passes through the nip for subsequent transfer and fusing to the final print media 108 via the transfer device 106 and fuser 110 in FIG. 2.

Each of the xerographic marking devices 102 is operable under control of the controller 122 to transfer toner 151-154 of a corresponding color (e.g., cyan (C), magenta (M), yellow (Y), black (K)) to the transfer belt 104, where the first device 102 encountered by the ITB 104 in one example provides yellow toner 151, the next device provides magenta toner 152, the next provides cyan toner 153, and the last device 102 provides black toner 154, although other organizations and configurations are possible in which two or more marking devices 102 are provided.

In normal operation, print jobs 118 are received at the controller 122 via an internal source such as a scanner (not shown) and/or from an external source, such as one or more computers connected to the system 100 via one or more networks, or from wireless sources. The print job execution may include printing selected text, line graphics, images, magnetic ink character recognition (MICR) notation, etc., on the front and/or back sides or pages of one or more sheets of paper or other printable media 108. In this regard, some sheets may be left completely blank in accordance with a particular print job 118, and some sheets may have mixed color and black-and-white printing. Execution of the print job 118, moreover, may include collating the finished sheets in a certain order, along with specified folding, stapling, punching holes into, or otherwise physically manipulating or binding the sheets. The system 100 can include one or more sensors 160 internal to the marking stations 102 and/or external thereto, for instance, to measure one or more marking material transfer characteristics relative to the intermediate transfer belt 104 or other photoreceptor or with respect to a final printed medium 108, and corresponding feedback signals or values are provided to the controller 122.

Referring also to FIGS. 3 and 4, the exemplary xerographic stations 102 each include a multi-beam ROS 200 which generate latent images along a circuitous length of a drum type photoreceptor 204 (shown in partial section view with the process direction into the page in FIG. 3) using a plurality of beams 222. A ROS controller 202 provides one or more control signals to a driver 212 and a ROS clock 201, where a data stream is provided from the controller 202 to the driver 212 associated with 32 laser-type light sources 214, for instance, arranged as a laser emitter array of eight groups of four lasers in one embodiment. The controller also operates the clock 201, which in turn provides a clock output to the driver 212 and to a motor polygon assembly (MPA) that includes a polygon motor speed control 228a and a rotating polygon 228 with a plurality of reflective (e.g., mirrored) outer surfaces or facets 226 (eight in one example).

In operation, a stream of image data is provided to the driver 212 associated with a single color portion of a panel image in the printer of FIG. 2, and the driver 212 modulates the lasers 214 to produce a plurality of modulated light outputs or beams 222 in conformance with the input image data. The laser beam light output 222 passes into conditioning optics 224 and then illuminates a facet 226 of the rotating polygon 228. The light beams 222 are reflected from the polygon facet 226 through a lens 230 to form corresponding spots on the photosensitive image plane of the passing photoreceptor 204 drum. Rotation of the facet 226 causes the spots to sweep across the image plane in order to form a succession of scan lines oriented in a "fast scan" direction (e.g., generally perpendicular to a "slow scan" or process direction along which the photoreceptor 204 travels), where modulation of the light outputs 222 by the driver selectively creates spots or pixels in given locations along the fast scan direction. In the multi-beam arrangement of the ROS 200, 32 such scan lines are created concurrently with the image data provided to the individual lasers 214 being interleaved accordingly.

Movement of the photoreceptor 204 in the slow scan direction is such that successive rotating facets 226 of the polygon 228 form successive sets of 32 scan lines that are offset from each other in the slow scan direction. In this regard, each facet 226 may scan 32 scan lines, but the photoreceptor 104 may move such that the top 16 scan lines from the next facet 226 can overlap the bottom 16 scan lines from the previous facet 226, causing so-called overwriting issues. Other problems in such systems can include scan line interlacing. Thus, although sets of 32 scan lines are ideally offset from one another, the offset may in certain system not be complete, and the inventors have appreciated that wiper-induced jitter amplification can differ based on the presence or absence of overwrite.

Within each set of 32 scan lines, moreover, the laser emitter array 214 provides mechanical spacing of the individual light outputs 222 such that the spacing of adjacent scan lines is ideally uniform. Each such scan line in this example consists of a row of pixels produced by the modulation of the laser beams 222 as the laser spots scan across an image plane, where individual spots are either illuminated or not at various points as the beams scan across the scan lines so as to selectively illuminate or refrain from illuminating individual locations on the photoreceptor 204 according to the input image data. In this way a latent image is created by selectively discharging the areas of the photoreceptor 204 which are to receive a toner image. Exposed (drawn) portions of the image to be printed move on to a toner deposition station (not shown) where toner adheres to the drawn/discharged portions of the image. The exposed portions of the image with adherent toner then pass to a transfer station with a biased transfer roller (BTR, not shown) for transfer of the toner image to the intermediate transfer belt (ITB 104 in FIG. 2 above).

As seen in FIG. 4, moreover, the driver 212 includes a memory storing a plurality of delay values 213 corresponding to individual ones of the 32 light sources 214. In operation, the generation of individual ones of the scan lines is selectively delayed by the driver 212 according to the corresponding beam delay value 213, with the individual beam modulation being carried out according to the input image data. The MPA scanner 228 then directs the modulated light outputs 222 toward the photoreceptor medium 204 along the fast scan direction to generate an image on at least a portion of the medium 204.

Referring also to FIGS. 1 and 5-12, in accordance with the present disclosure, the beam delay values 213 are set or adjusted based at least partially on a wiper error 502 and a jitter error 802 associated with the ROS in the printing system 100. FIG. 1 illustrates a manufacturing or adjustment process 10 that may be carried out in association with the exemplary ROS 200 as installed in an imaging system, such as the printer 100 of FIG. 2, or in other imaging systems using multi-beam ROS devices. While the method 10 is illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. Certain embodiments of the illustrated method 10 and other methods of the disclosure may be implemented in hardware, processor-executed software, programmable logic, etc., or combinations thereof, whether in a single device management component or system or in distributed form in two or more components or systems, and may be employed in association with any form of multi-beam ROS or imaging system, wherein the disclosure is not limited to the specific devices, systems, applications, and implementations illustrated and described herein.

Figure 5:
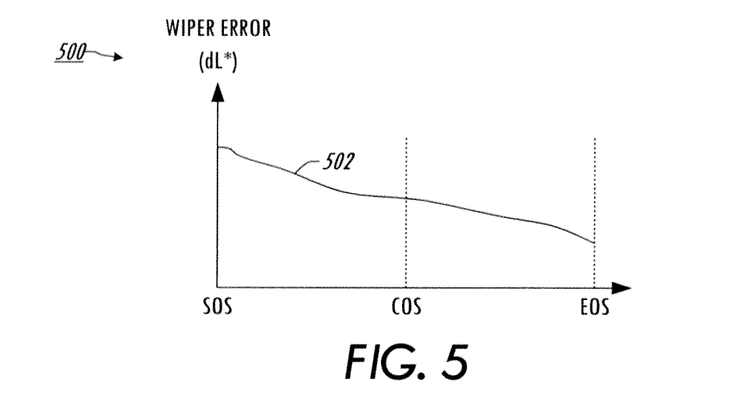
FIG. 5 is a graph illustrating a wiper error curve or function along a fast scan range of operation of the ROS of FIGS. 3 and 4 extending from a start of scan location to an end of scan location.
Figure 6:
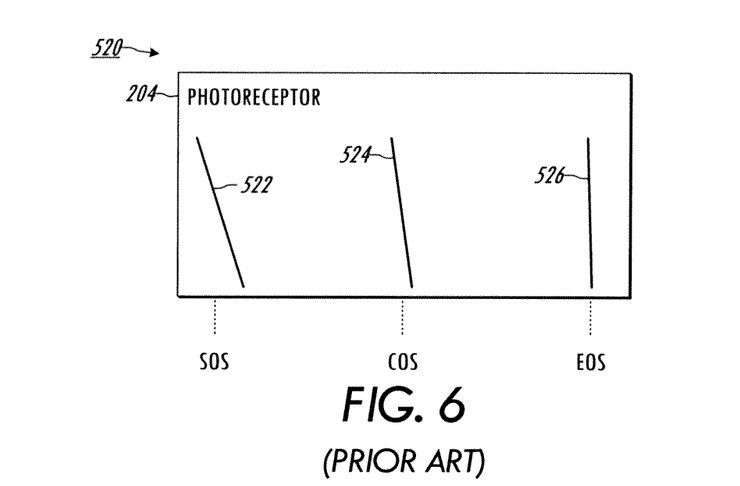
FIG. 6 is an exemplary photoreceptor column output image illustrating wiper error corresponding to the error curve of FIG. 5.

At 12 in FIG. 1, a ROS 200 is operatively coupled with or otherwise installed in a printing system 100 (e.g., in one of the marking devices 102 of FIG. 2). At 14, the document processing system 100 is operated using the installed ROS 200 to determine a wiper error curve or function 502 associated with the ROS 200. FIG. 5 provides a graph 500 illustrating a wiper error curve or function 502 along the ROS fast scan range that extends from a start of scan location (SOS) to an end of scan location (EOS), with a central COS location midway between the SOS and EOS locations. As seen in the example of FIG. 5, the wiper error may be quantified as a curve 502 and/or as a formula (e.g., parametric characterization represented as parameters of an equation, etc.) as a function of some error metric associated with image creation, rendering, etc. For instance, the Y axis in the graph 500 may represent errors in perceived (e.g., sensed) darkness or brightness (e.g., dL* in an L*a*b* color space) based on feedback from a system sensor 160 during operation of the system 100 to create one or more test images (e.g., columns) and comparison thereof with a known desired brightness value from the input data to identify, ascertain, or derive a curve of formula 502 indicative of brightness error related to the wiper effect in a raster scanning apparatus 200. A graph 520 in FIG. 6 shows a photoreceptor column output image with corresponding wiper error, with exemplary SOS, COS, and EOS columns 522, 524, and 526, each of which is tilted in the same direction. In this example, the largest tilt is at the SOS location, with the smallest tilt at the EOS, and the tilt angle at the COS location is between the angles of the COS and EOS columns.

Figure 7:
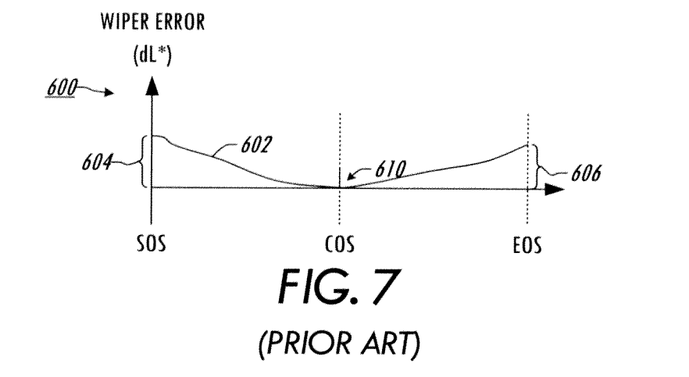
FIGS. 7 and 8 provide a graph and an exemplary photoreceptor column output image illustrating a conventional compensated wiper error function in which beam mapping adjustment provides beam delays so that column alignment is provided at the COS position with the wiper effect being approximately equal at the SOS and EOS ends of the ROS fast scan range.
Figure 8:
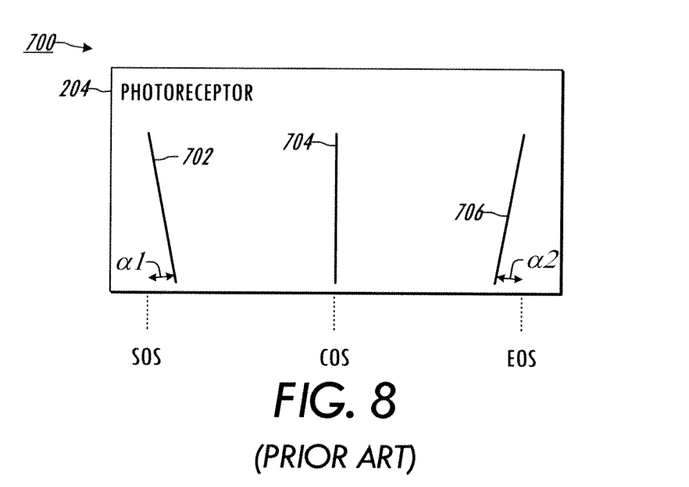

Referring briefly to FIGS. 7 and 8, a graph 600 in FIG. 7 shows an a conventional compensated wiper error function or curve 602 in which beam mapping adjustment provides beam delays so that column alignment is provided at the COS position 610. FIG. 8 shows a photoreceptor column output image 700 on a photoreceptor 204 including column images 702, 704 and 706 at the SOS, COS and EOS positions, respectively, corresponding to the compensated wiper error function 602 of FIG. 6. As seen in FIG. 8, the column image 704 is aligned at the COS location. In contrast, the SOS and EOS columns 702 and 706 are out of alignment, being at angles α1 and α2 with respect to the process direction, respectively. In this example, the SOS and EOS offset angles α1 and α2 are approximately equal. As seen in FIG. 7, moreover, this conventional compensation via beam mapping effectively spreads the wiper error effect approximately equally at the SOS and EOS ends of the ROS fast scan range, where the dL* errors 604 and 606 are approximately equal. It is noted that while this conventional wiper compensation technique may effectively minimize the wiper error effect, this does not take into account jitter effects in the ROS.

Figure 9:
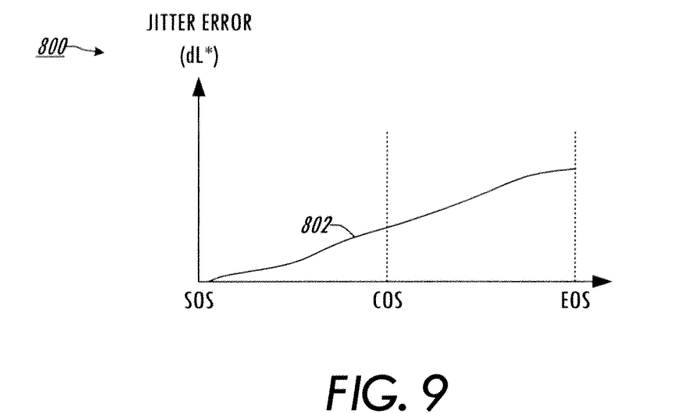
FIG. 9 is a graph illustrating an exemplary jitter error curve or function in the ROS of FIGS. 3 and 4.
Figure 10:
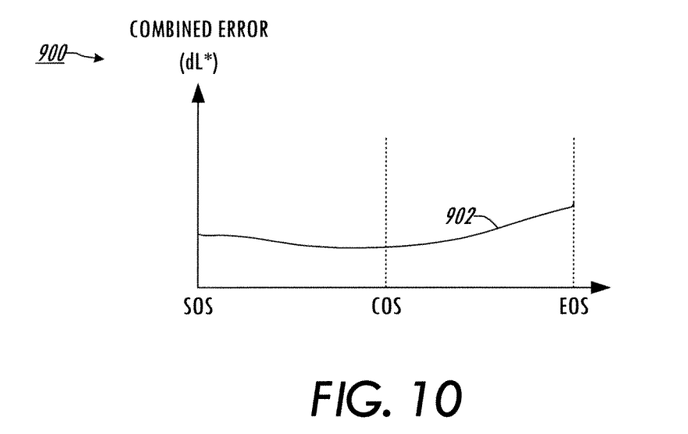
FIG. 10 is a graph illustrating an combined wiper/jitter error curve or function in the ROS of FIGS. 3 and 4.

Referring now to FIGS. 1, 9 and 10, the inventors have appreciated additive or multiplicative interaction between jitter effects and wiper effects, which are believed to be particularly pronounced at or near the EOS location of the ROS fast scan range. Thus, while conventional wiper error compensation such as shown in FIGS. 5-8 is in some sense optimized to ideally zero out the wiper error, this compensation leaves the ROS vulnerable to banding or other potentially perceptible image artifacts due to the combined jitter and wiper effects.

The process 10 in FIG. 1 also provides for determining a jitter error at 16, and a combined wiper/jitter error curve or function is determined at 18. In certain embodiments, the document processing system 100 is operated after ROS installation to determine a jitter error as a function of fast scan position, where FIG. 9 illustrates a graph 800 showing an exemplary jitter error curve or function 802 in the ROS 200 of FIGS. 3 and 4. At 18 in FIG. 1, the combined effect of the wiper error 502 and the jitter error 802 is determined, where graph 900 in FIG. 10 illustrates an exemplary combined wiper/jitter error curve or function 902 determined according to the wiper error 502 (FIG. 5) and the jitter error 802 of FIG. 9. Any suitable technique can be employed for deriving the combined error function or curve 902. In certain embodiments, this is done at 18 by multiplying the wiper error 502 and the jitter error 802 to generate the combined error curve or function 902 along the fast scan range of operation of the ROS 200. In other embodiments, the combined error function or curve 902 is determined at 18 by adding the wiper error 502 and the jitter error 802. In either of these implementations, the multiplication or summation can include weighting factors for one or both of the wiper error 502 and the jitter error 802. Moreover, while the exemplary implementations of the error curves or functions 502, 802, 902 are shown in brightness error units (e.g., dL*), other error metrics may be used.

The present disclosure provides for determining the ROS driver beam delay values 213 at 20 in FIG. 1 in whole or in part according to the wiper error 502 and the jitter error 802. The process 10 further includes storing the beam delay values 213 at 22 in a memory of the ROS 200 (e.g., FIG. 4) for use in image scanning. As seen in the example of FIG. 9, the jitter error curve or function 802 (also shown in terms of brightness error metric dL* in this example) is small at the start of scan and increases toward the EOS location. While not wishing to be tied to any particular theory, it is believed that the cumulative effects of the wiper and jitter errors 502 and 802 exacerbate the ROS imaging near the EOS location, and consequently, the conventional technique of delay adjustment solely for wiper error (e.g., FIGS. 7 and 8) actually creates problems, contrary to the conventional wisdom.

Figure 11:
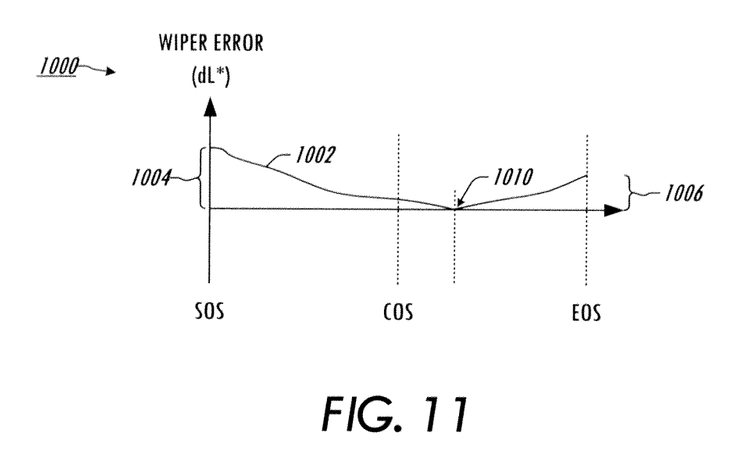
FIGS. 11 and 12 show a graph and a photoreceptor column output image for a compensated wiper error function with column alignment spaced from the COS position toward the EOS location.
Figure 12:
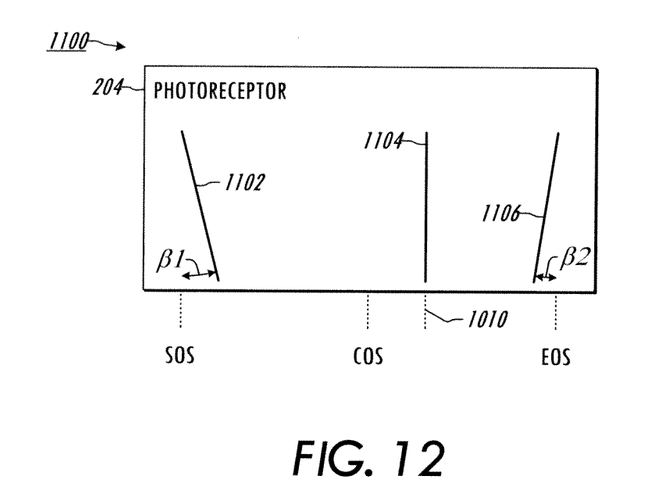

Referring also to FIGS. 11 and 12, the wiper compensation in certain embodiments is done at 20 by beam mapping to set the delay values 213 such that column alignment is achieved at an alignment location 1010 at the EOS or between the COS and EOS, unlike the conventional wiper compensation (FIGS. 7 and 8) which instead set the alignment at the COS. The inventors have appreciated that control over the alignment location 1010 used in the beam mapping can advantageously reduce the cumulative error of the wiper and jitter errors 502 and 802. In certain embodiments, the delay values 213 are determined at 20 by beam mapping to compensate for the combined effect 902 of the wiper error 502 and the jitter error 802. The delay values 213 may be determined in certain implementations so as to minimize an area of the combined error curve or function 902 along the fast scan range of operation of the ROS 200.

As seen in the graph 100 of FIG. 11, a compensated wiper error curve 1002 results from the delay value selection at 20, in which the alignment location 1010 is spaced from the COS location toward the EOS (in certain embodiments, the alignment location 1010 may be at or near the EOS). FIG. 10 shows a photoreceptor column output image 900 on the photoreceptor 204 including column images 1102 and 1106 at the SOS and EOS positions, respectively, as well as an aligned column image 1104 at the alignment location 1010, which is spaced from the center position COS. In this example, the SOS and EOS columns 1102 and 1106 exhibit the wiper effect (offset angles β1 and β2 relative to the process direction). In this example, the offset angles β3 are different at the SOS and EOS locations, and the resulting wiper error amounts 1004 and 1006 in FIG. 11 are different, although not a requirement of the present disclosure. As previously noted, this asymmetrical wiper error is contrary to the conventional wiper adjustment approach, in which it was believed that minimizing the area under the wiper error curve through beam mapping was the optimal compensation.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A raster output scanner (ROS) for generating an image on a portion of a light-receiving medium traveling along a process path past the ROS, comprising:
   a plurality of light sources operative to generate a plurality of light outputs;
   a driver with a memory storing a plurality of beam delay values corresponding to individual ones of the plurality of light sources, the beam delay values set to compensate for a combined additive or multiplicative effect of wiper error and jitter error such that column alignment is achieved at an alignment location spaced from a center of scan (COS) location toward an end of scan location (EOS) along a fast scan range of operation of the ROS by generating a combined error curve or function along the fast scan range, wherein the beam delay values are set such that an area of the combined error curve or function is minimized along the fast scan range of operation of the ROS, the driver being operative to selectively actuate the plurality of light sources according to the corresponding beam delay values based on a stream of image data to produce a plurality of modulated light outputs; and
   a scanner that directs the modulated light outputs from the light sources toward a light-receiving medium along the fast scan direction to generate an image on at least a portion of the light-receiving medium.

2. The ROS of claim 1, where the plurality of light sources is a laser emitter array comprising a plurality of lasers individually operative to generate light outputs; where the light-receiving medium is a photoreceptor of a printing system; and where the scanner is operative to direct the light outputs from the laser emitter array toward the photoreceptor along the fast scan direction to generate a latent image on at least a portion of the photoreceptor.

3. The ROS of claim 2, where the scanner comprises a polygon mirror with a plurality of reflective surfaces and a polygon motor speed control operative to control rotation of the polygon mirror, where reflection of the modulated light outputs from the laser emitter array off at least one reflective surface of the polygon mirror directs the modulated light outputs toward the photoreceptor.

4. The ROS of claim 1, where the scanner comprises a polygon mirror with a plurality of reflective surfaces and a polygon motor speed control operative to control rotation of the polygon mirror where reflection of the modulated light outputs from the light sources off at least one reflective surface of the polygon mirror directs the modulated light outputs toward the light-receiving medium.

5. The ROS of claim 1, wherein the beam delay values are set to compensate for a combined additive effect of wiper error and jitter error based on addition of the wiper error and the jitter error to generate the combined error curve or function along the fast scan range of operation of the ROS.

6. The ROS of claim 1, wherein the beam delay values are set to compensate for a combined multiplicative effect of wiper error and jitter error based on multiplication of the wiper error and the jitter error to generate the combined error curve or function along the fast scan range of operation of the ROS.

7. A document processing system, comprising:
   at least one marking device operative to transfer marking material onto an intermediate medium;
   a transfer station positioned proximate a travel path of the intermediate medium and operative to transfer the marking material from the intermediate medium to a printable media; and
   a raster output scanner (ROS) operatively associated with the at least one marking device to generate an image on a portion of a light-receiving medium, the ROS comprising:
      a laser emitter array comprising a plurality of lasers individually operative to generate light outputs,
      a driver with a memory storing a plurality of beam delay values corresponding to individual ones of the plurality of light sources, the beam delay values set to compensate for a combined additive or multiplicative effect of wiper error and jitter error such that column alignment is achieved at an alignment location spaced from a center of scan (COS) location toward an end of scan location (EOS) along a fast scan range of operation of the ROS by generating a combined error curve or function along the fast scan range, wherein the beam delay values are set such that an area of the combined error curve or function is minimized along the fast scan range of operation of the ROS, the driver being operative to selectively actuate the plurality of light sources according to the corresponding beam delay values based on a stream of image data to produce a plurality of modulated light outputs, and
      a scanner that directs the modulated light outputs from the light sources toward the light-receiving medium along the fast scan direction to generate a latent image on at least a portion of the light-receiving medium.

8. The document processing system of claim 7, where the scanner comprises a polygon mirror with a plurality of reflective surfaces and a polygon motor speed control operative to control rotation of the polygon mirror, where reflection of the modulated light outputs from the laser emitter array off at least one reflective surface of the polygon mirror directs the modulated light outputs toward the photoreceptor.

9. The document processing system of claim 7, wherein the beam delay values are set to compensate for a combined additive effect of wiper error and jitter error based on addition of the wiper error and the jitter error to generate the combined error curve or function along the fast scan range of operation of the ROS.

10. The document processing system of claim 7, wherein the beam delay values are set to compensate for a combined multiplicative effect of wiper error and jitter error based on multiplication of the wiper error and the jitter error to generate the combined error curve or function along the fast scan range of operation of the ROS.

11. A method of manufacturing or adjusting a document processing system, the method comprising:
   operatively coupling a raster output scanner (ROS) with at least one marking station in a document processing system;
   operating the document processing system to determine a wiper error associated with the ROS;
   operating the document processing system to determine a jitter error associated with the ROS;
   determining a combined effect of the wiper error and the jitter error by multiplying the wiper error and the jitter error to generate a combined error curve or function along the fast scan range of operation of the ROS;

determining a plurality of beam delay values corresponding to individual ones of a plurality of light sources of the ROS so as to compensate for the combined effect of the wiper error and the jitter error, where the plurality of beam delay values are determined such that an area of the combined error curve or function is minimized along the fast scan range of operation of the ROS; and storing the plurality of beam delay values in a memory of the ROS.

12. The method of claim 11, where the plurality of beam delay values are determined such that column alignment is achieved at an alignment location spaced from a center of scan (COS) location toward an end of scan location (EOS) along a fast scan range of operation of the ROS.

13. A method of manufacturing or adjusting a document processing system, the method comprising:

operatively coupling a raster output scanner (ROS) with at least one marking station in a document processing system;

operating the document processing system to determine a wiper error associated with the ROS;

operating the document processing system to determine a jitter error associated with the ROS;

determining a combined effect of the wiper error and the jitter error by adding the wiper error and the jitter error to generate a combined error curve or function along the fast scan range of operation of the ROS;

determining a plurality of beam delay values corresponding to individual ones of a plurality of light sources of the ROS so as to compensate for the combined effect of the wiper error and the jitter error, where the plurality of beam delay values are determined such that an area of the combined error curve or function is minimized along the fast scan range of operation of the ROS; and storing the plurality of beam delay values in a memory of the ROS.

14. The method of claim 13, where the plurality of beam delay values are determined such that column alignment is achieved at an alignment location spaced from a center of scan (COS) location toward an end of scan location (EOS) along a fast scan range of operation of the ROS.

* * * * *